United States Patent
Leemet et al.

(10) Patent No.: US 8,626,119 B2
(45) Date of Patent: *Jan. 7, 2014

(54) SYSTEM AND METHOD FOR MANAGING A MOBILE DEVICE

(71) Applicants: Jaan Leemet, Dollard-des-Ormeaux (CA); Daniel Rudich, Dollard-des-Ormeaux (CA)

(72) Inventors: Jaan Leemet, Dollard-des-Ormeaux (CA); Daniel Rudich, Dollard-des-Ormeaux (CA)

(73) Assignee: Tangoe, Inc., Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,157

(22) Filed: Jan. 15, 2013

(65) Prior Publication Data

US 2013/0267196 A1    Oct. 10, 2013

Related U.S. Application Data

(63) Continuation of application No. 13/560,383, filed on Jul. 27, 2012, now Pat. No. 8,412,154.

(60) Provisional application No. 61/622,365, filed on Apr. 10, 2012.

(51) Int. Cl.
*H04M 11/00* (2006.01)

(52) U.S. Cl.
USPC .......................................... 455/406; 709/203

(58) Field of Classification Search
USPC ............... 455/406, 412.2, 405; 370/252, 241; 709/203, 230
See application file for complete search history.

(56) References Cited

U.S. PATENT DOCUMENTS

| | | |
|---|---|---|
| 7,650,137 B2 | 1/2010 | Jobs et al. |
| 2006/0276180 A1 | 12/2006 | Henry, Jr. |
| 2012/0084349 A1 | 4/2012 | Lee et al. |

*Primary Examiner* — Phuoc Doan
(74) *Attorney, Agent, or Firm* — St. Onge Steward Johnston & Reens LLC

(57) ABSTRACT

A system and method for managing a mobile device(s) to provide for a notification(s) when specified thresholds are reached and/or execute defined rules for the mobile device(s). The rules can relate to any function of the mobile device(s), including but not limited to, notification when a percentage of voice/data/SMS is reached during a billing cycle, notification when a mobile device(s) leaves a geo-fence, and restrict a mobile device(s) when a threshold is reached. The system provides a versatile management system allowing a user to effectively control use of a mobile device(s) and manage costs.

23 Claims, 11 Drawing Sheets

SYSTEM AND METHOD FOR MANAGING A MOBILE DEVICE

FIELD OF THE INVENTION

The invention relates to a system and method for managing a mobile communication device, and more particularly, to a system and method for providing enhanced control over a smartphone device.

BACKGROUND OF THE INVENTION

The use of mobile phones, and in particular, smart phones, has increased markedly. Unlike traditional mobile phones, smart phones provide enhanced data management and processing capabilities. For example, smart phones are capable of: connecting to the Internet, presenting image files, running videos, streaming media, opening and editing documents, files and presentations, and downloading and installing numerous types of applications to run on the smartphone.

Increasingly smart phones are being used by students and young family members who have virtually unlimited access to the above-described functionality, some of which are very data intensive. Lack of experience in using and paying for telecommunications services, coupled with heavy data usage may lead to a large voice/data bill at the end of the billing cycle sometimes called "bill shock." This is especially so with the rising popularity of streaming media, text messaging and the proliferation of numerous applications "Apps" that can be purchased for a relatively low price (or provided free of charge) and downloaded directly to a smart phone.

In addition to the freedom to access and download vast amounts of data with a smart phone, the growing popularity of smart phones is increasing the use of these devices by younger generations (e.g., school age users). Rather than waiting for breaks between classes to communicate, students have the ability to communicate anytime and anywhere (including while in classes). With the rising popularity of text messaging, data usage by younger uses continues to escalate as well as the ability to access multimedia while in class. Another problem with smart phone use by students is the unlimited ability of students to access and obtain information during class when they shouldn't, such as, for example, when taking a test. Additionally, younger users of mobile devices have increasingly utilized voice and data features late into the evening hours, which can have a negative impact on the amount of sleep they obtain.

In addition to the many voice and data features listed above, smart phones are capable of providing for other functionality relating to location finding. For example, smartphones are capable of locating the device so as to provide a current location and directions for the user of the device. As students increasingly face a range of personal safety issues, it is contemplated that the location finding technology can be utilized in a number of ways to enhance security for the student.

SUMMARY OF THE INVENTION

Accordingly, what is desired then is a system and method that helps to prevent mobile device "bill shock" and provide parental control for mobile device use.

It is also desired to provide a system and method that allows for checking on the current usage of a voice and/or data plan during a billing cycle so as to determine actual usage at that point during the billing cycle.

It is further desired to provide a system and method that will provide a notification to a user/administrator/parent/etc. when certain thresholds have been reached or exceeded relating to a voice/data plan during a billing cycle.

It is still further desired to provide a system and method that will allow a user/administrator/parent/etc. to set custom criteria for receiving a notification relating to a voice/data plan during a billing cycle.

It is yet further desired to provide a system and method that will allow a user/administrator/parent/etc. to set restrictions on the time, location, phone number(s), applications and data source(s) a user may access with a mobile device(s).

It is also desired to provide a system and method that utilizes the location finding ability of a mobile device to provide enhanced security and alerting capabilities for parents and for users.

These and other objects are achieved by the provision of a system that allows, for example, for a parent to monitor and set limits as well as limit usage periods on a student's voice/data usage with the student's smart phone. The term "smart phone" as used herein means a mobile device built on a mobile computing platform.

In one embodiment, the present invention provides a fully integrated system where an administrator (e.g., a parent), may log onto a website and register various mobile devices for inclusion in the family's telecommunications network for monitoring of a user (e.g., a child) mobile device. The website provides a real-time, user-friendly solution that allows the parent to easily monitor and limit telecommunications expenses, while ensuring the safety of their loved ones in an increasingly mobile world.

In one embodiment, the administrator can define notifications that will notify the administrator if the user has exceeded a voice and/or data limit for a mobile device during a billing cycle. The administrator can set usage limits such that the mobile device is "cut off" when certain defined limits are reached to ensure that "bill shock" is avoided. Likewise, the notifications can be based, not only on voice/data usage, but on the time of the usage and duration of the usage. For example, a parent may want to be notified that a child was using the mobile device from 2 am to 4 am. It is further contemplated that the administrator may desired to provide for limited mobile device usage during certain hours of the day (e.g., no voice/data usage from 12 midnight through 7 am; or no voice/data usage during school hours).

Still further, an administrator may want to define particular limitations, but still allow for use of other features on the mobile device based on time and/or location. For example, a parent may want to restrict the voice/data usage for a mobile device when the student is at school during class hours. However, the parent wants the child to always be able to call certain phone number the parents phone (home/mobile/work/etc.), a relative's phone, the school number, or an emergency number (police/fire/911/etc.). As stated above, the restriction in voice/data usage could be based on both time and location. In the circumstance stated above, the student's mobile device would be restricted when the mobile device was in a predefined geo-fence (e.g., surrounding the school or area defined by the parent). During weekends, the restriction would not apply, or if the student was outside the geo-fence, the restriction would not apply. Alternatively, the student's voice usage could be restricted in duration. In this embodiment, the parent could limit the duration (i.e., 5 minutes) of phone calls during school hours, while still providing exceptions to this rule. It can be seen that the parent can create a fully customized system effectively mixing and matching rules for voice/data usage as desired where each mobile device can be treated separately.

Alternatively, the administrator could define a notification to be generated if the mobile device left the geo-fence during a defined time (e.g., left the school area during school hours).

It should be understood that the term "notification" as used herein can be applied to an alert that an administrator has access to informing the administrator that a threshold has been reached or exceeded or that attention should be given to a matter. For example, the notification may comprise an email or a text message that is pushed out to the administrator. The email or text may define the issue or may alert the administrator to log onto the website to see the notification. Alternatively, the notification may be in the form of an alert that is presented to the administrator when the administrator logs onto the website (e.g., a red message flag is presented). In any event, the purpose is to bring a message to the administrator's attention. The administrator may further be presented with an option or series of options as to whether to limit further access by the mobile device or to continue to allow the mobile device to function. For example, in one embodiment, a notification may be generated and sent to a parent's mobile phone that a child's data limit is 50% consumed while only one week into the billing cycle. The parent has the option to limit data usage for the next week until the billing cycle is halfway complete. Alternatively, the parent could allow continued usage, but automatically shut off usage when 100% usage for the billing cycle is reached. Still further, a notification could also be sent to the user device (the child's phone) informing the child of the usage. For example, a notification could be sent to the user device at 25% usage, at 50% usage, at 75% usage and at 100% usage, or any defined percentage. Whereas, a notification may be sent to the parent's mobile device (or email, etc.) at selected times and usage thresholds. The object is to provide feedback so as to avoid overages charges. While the use of a percentage has been provided above, it should be understood that other categories may be monitored and/or reported, including, for example but not limited to, measuring bytes, measuring dollars or money such that an alert could be provided on a dollar/money overage basis, and so on. This would provide maximum flexibility for the parent to monitor and set up alerts as desired.

In still another embodiment, the administrator could be provided with a notification that identifies that a usage threshold has been reached (whether usage amount only, or a combination of usage and time in the billing cycle) and could provide feedback or input to the administrator relating to a possible adjustment in the billing plan. For example, the system could analyze the family voice/data usage versus the current voice/data plan and suggest migration to an alternative voice/data billing plan that would save the family money. In this manner, the system functions not only to limit voice/data usage to avoid "bill shock", but actively assists the administrator to proactively avoid overage charges by helping to facilitate a change to a voice/data plan that better fits the family usage. It should be noted that the system would not be limited to only suggesting a voice/data plan that would increase the voice/data limits, but could further analyze the family usage and suggest lowering the plan to a more economical plan if the family's voice/data usage is consistently below the current plan limit.

The system may further provide for cost projection analysis. In one embodiment, the system can look at the current trend of the billing cycle and can "project" a cost based on the current trend. Still further, the system can "project" a cost based, not only on the current usage for the billing cycle, but can include analysis information from previous billing cycles. For example, it could be that there is heavy usage for the first week of the billing cycle, however, the trend for the past number of billing cycles is that the usage typically tails off for the second week, and so one. In this manner, a notification would not necessarily be generated based solely on usage in that one billing cycle. Alternatively, if voice/data usage is at 75% at the end of the third week of the billing cycle (assuming a four week billing cycle), if the trend has been heavy data usage at the end of the billing cycle, a notification may be generated that alerts the user to this effect. For example, a text or email can be sent to the administrator, who, when they log onto the website, can access a graph that illustrates the current usage in the billing cycle versus an average usage for the past number of billing cycle with a cost projection for the current billing cycle.

As family members increasingly become more mobile, the security of family members is a concern. Parents can also rest comfortably knowing their child's smart phone is being safely monitored including location tracking. Parents can receive email/text alerts about critical events, for example, my/our child has left a geo-fence area (e.g., school area) during school hours. Alternatively, families looking to keep track of an elderly parent may be alerted if the individual leaves a geo-fence defined area or fails to move in a given time period indicating they are perhaps injured or disabled, and can provide for GFS tracking of the mobile device for location of the elderly parent.

Security for family members is further enhanced by an emergency alerting function such that if certain phone numbers are dialed on the mobile device (i.e., 911 is called), an emergency text message or email is sent to the parent(s) alerting the parents that a call was made and providing an location of where the call was made from. Still further, an anti-bullying function may be provided in the mobile device such that, in the event a child is in a situation that they do not feel comfortable with, they can one-touch dial a predetermined number (e.g., the school office, a parent, etc.) and a text message or email can again, automatically be sent to a parent or other individual identifying that an emergency was made and can provide a location of the device when the call was made and provide for active tracking of the device and could be made available to authorities if necessary.

In still another embodiment, reports may also be generated by the system detailing mobile device usage for each user at the end of each billing cycle or at any time the administrator logs on to the system and decides to generate a report. For example, at the halfway point of a billing cycle, the parent could generate and print a report including a graph of voice/data usage, which could then be presented to the student to show the child their current usage for the month with a projected usage and cost for the entire billing cycle. Additionally, based the current and historical usage patterns, the system could provide suggestions for lowering cost.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms. "Data" may be accessible, whether over-the-air, or via cable, satellite, network, distributed on storage media, or otherwise, without regard to the form or content thereof, and including but not limited to audio, video, text, images, animations, web pages and streaming media data.

The term "network" as used herein includes both networks and internetworks of all kinds, including the Internet, and is not limited to any particular network or inter-network.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The term "object" as used herein means a distinct software module or collection of computer code that possesses (1) data that uniquely separates the module or collection of computer code from other similar modules or collections, (2) attributes constituting a predetermined subset of data types describing media data usage and/or media data users and/or any other supporting datatypes or users, and (3) behavior which (i) limits access to such attributes by responding only to requests conforming to a predetermined published interface, and (ii) gathers data of such predetermined subset or merges objects which possess such data.

The terms "process" and "processing" as used herein each mean an action or a series of actions including, for example, but not limited to, the continuous or non-continuous, synchronous or asynchronous, direction of data, modification of data, formatting and/or conversion of data, tagging or annotation of data, measurement, comparison and/or review of data, and may or may not comprise a program.

In one advantageous embodiment a system for managing a telecommunications device is provided comprising a server coupled to a network, the server having a webpage accessible by a user with a user computer and a storage accessible by the server. The system further comprises a registration module on the server and allowing the user to register a mobile device, and a mobile device plan module on the server and receiving information relating to a telecommunications service plan associated with the mobile device. The system still further comprises a threshold module on the server, where the threshold module allows a user to set at least one threshold for the mobile device. Finally, the system comprises a notification module on the server, where the notification module generates a notification accessible by the user when the at least one threshold is reached.

In another advantageous embodiment a method for managing a telecommunications device is provided comprising the steps of providing a webpage on a server connected to a network that is accessible by a user computer, and providing a registration module on the server allowing a user to register a mobile device. The method also includes the steps of providing a mobile device plan module on the server for receiving information relating to a telecommunications service plan associated with the mobile device, and providing a threshold module on the server allowing a user to set at least one threshold for the mobile device. Finally, the method includes the step of generating a notification with a notification module on the server when the at least one threshold is reached, the notification accessible by the user.

Other objects of the invention and its particular features and advantages will become more apparent from consideration of the following drawings and accompanying detailed description.

DETAILED DESCRIPTION OF THE INVENTION

Figure 1:
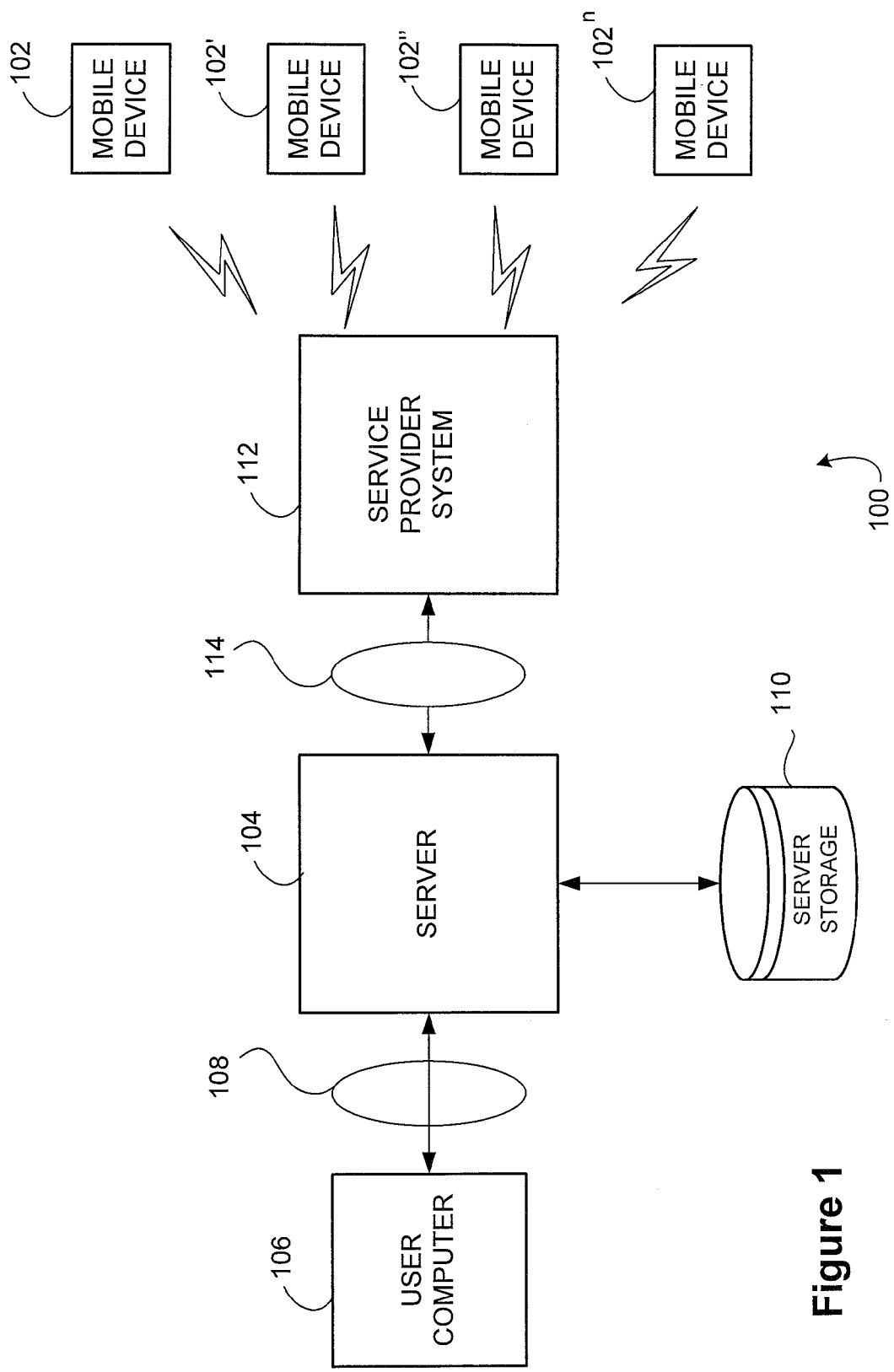
FIG. 1 is block diagram illustrating one advantageous embodiment of the present invention.

Referring now to the drawings, wherein like reference numerals designate corresponding structure throughout the views.

FIG. 1 is a block diagram depicting a system 100 for managing telecommunications devices 102, 102', 102" . . . 102". A user accesses a server 104 by means of a user computer 106. It is contemplated that user computer 106 accesses server 104 by means of a webpage interface over a network connection 108. As previously described, in one embodiment, the network connection may comprise the Internet.

Server 104 is provided with a server storage 110 accessible by the server 104, whether locally provided or provided remote from server 104. Server storage 110 may comprise virtually any type of storage device for storing electronic data and may be comprise, for example, but not limited to, RAM, ROM, CD, DVD, solid state, magnetic, optical or any other means for storing electronic data.

Server 104 is also illustrated coupled to service provider system 112 via a network connection 114. The service provider system 112 comprises an interface to the system used by the service provider(s) that provides mobile telecommunications services for the user. For example, server 104 may communicate with the service provider that provides commercial telecommunications services to the user relating to the mobile devices 102, 102', 102", 102". For example, server 104 may confirm user account information and mobile device 102, 102', 102", 102" information. As will be seen, server 104 may communicate with service provider system 112 to provide instructions relating to the operation of the mobile devices 102, 102', 102", 102". While mobile devices 102, 102', 102", 102" are shown wirelessly connected to a block entitled service provider system 112, it should be understood that service provider system 112 includes all the necessary wired and wireless communication equipment and computers used by a commercial service provider to provide wireless telecommunications services to the public.

Figure 2:
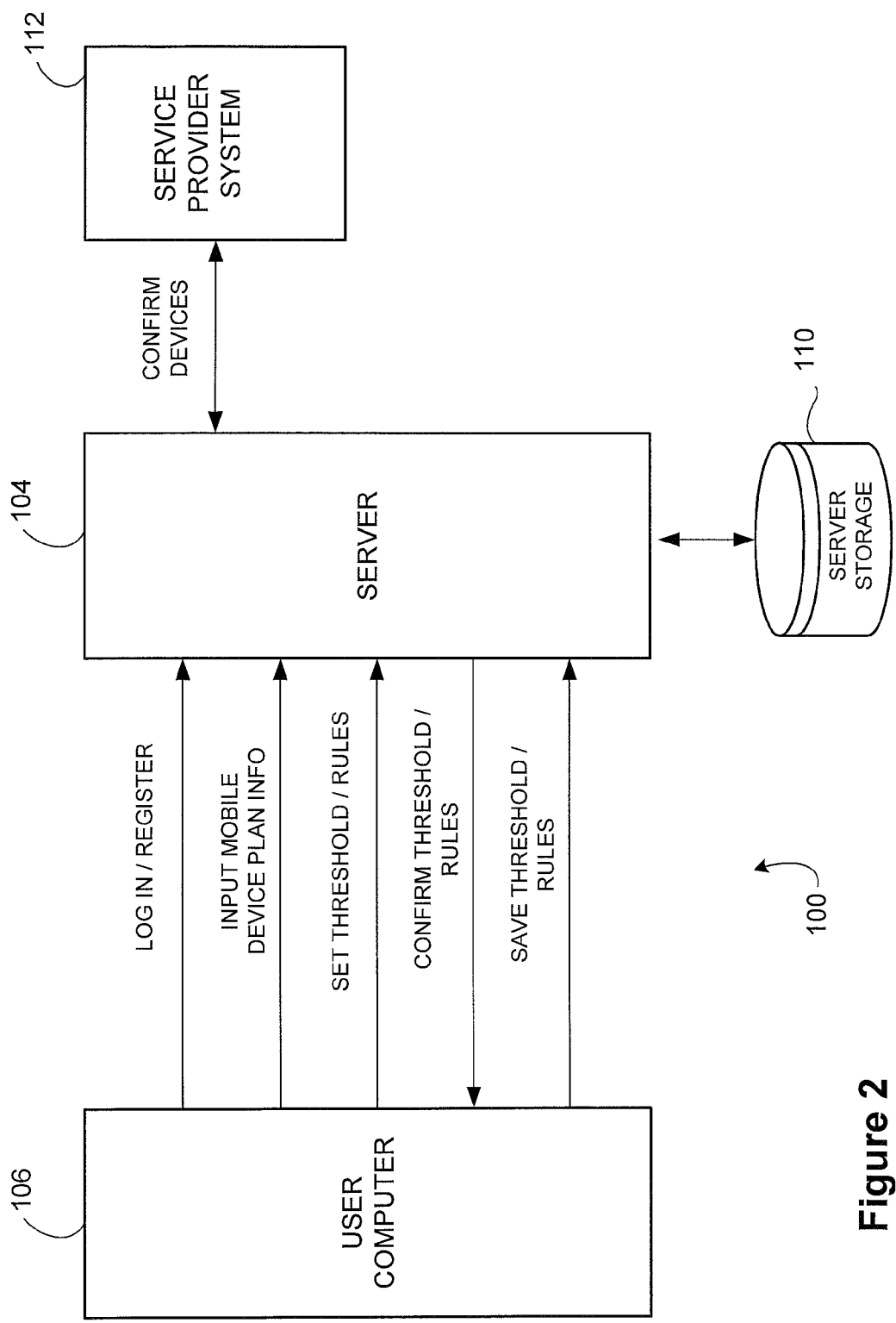
FIG. 2 is a block diagram according to the embodiment of FIG. 1.
Figure 3:
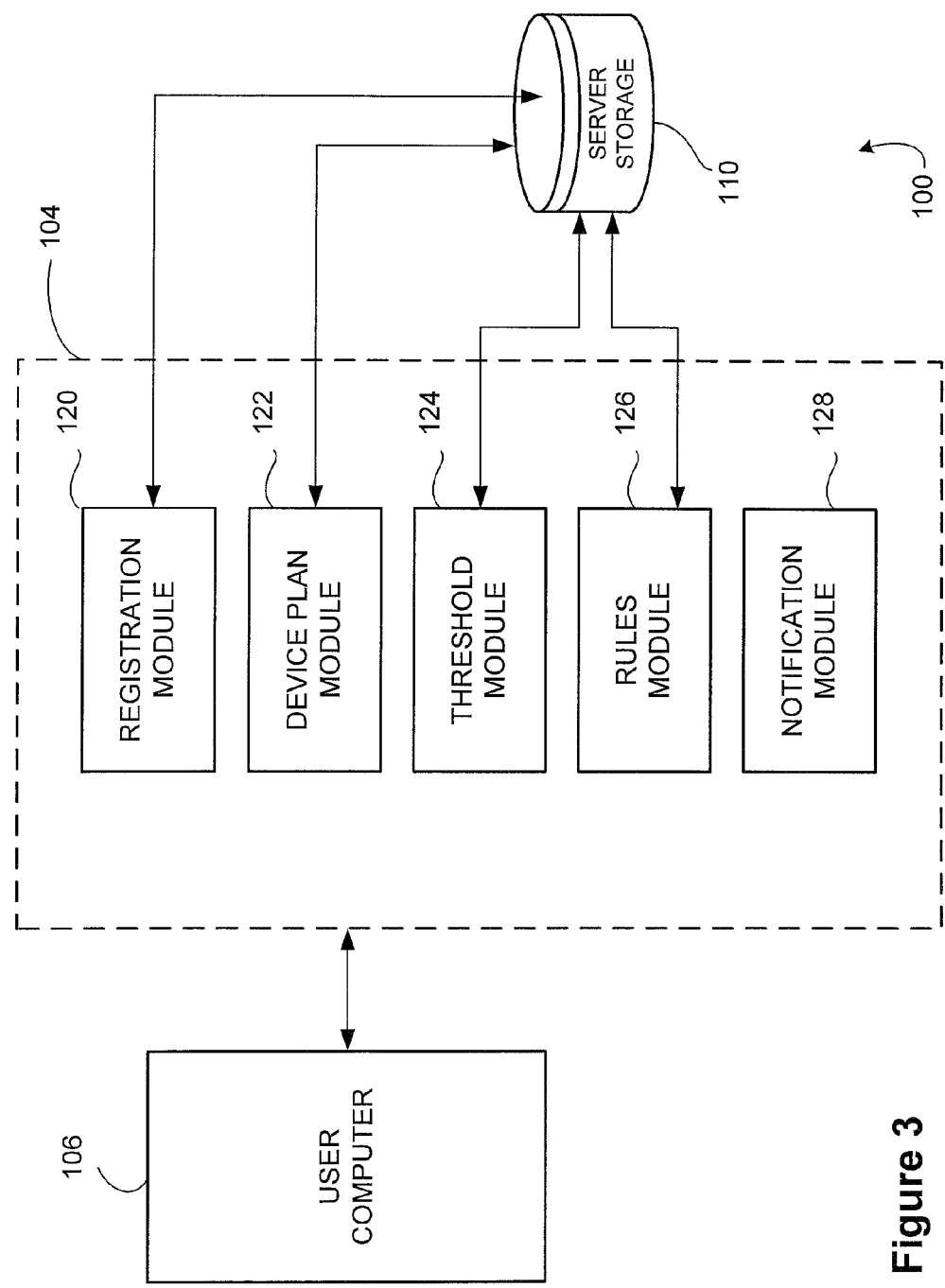
FIG. 3 is a block diagram according to the embodiment of FIG. 2.

Turning now to FIGS. 2 and 3, the process of logging in, registration and setting thresholds and rules is illustrated. For example, a user may access a webpage on server 104 to log in or alternatively, to register an account with the system 100. To register, the user would input various information into the system 100 including, for example, but not limited to, user name, user address (billing address), payment method, name of service provider, mobile device(s) information and service plan information, etc. The user may utilize registration module 120 and device plan module 122, which may comprise a webpage(s) presented to the user prompting the user to provide registration and device plan information.

The registration process may further include an install link that gets sent to each mobile device(s) 102, 102', 102", 102'". For example, the user could click on an "install link" that gets sent to each device such that each mobile device(s) 102, 102', 102", 102'" can navigate to and install the application.

Figure 5:
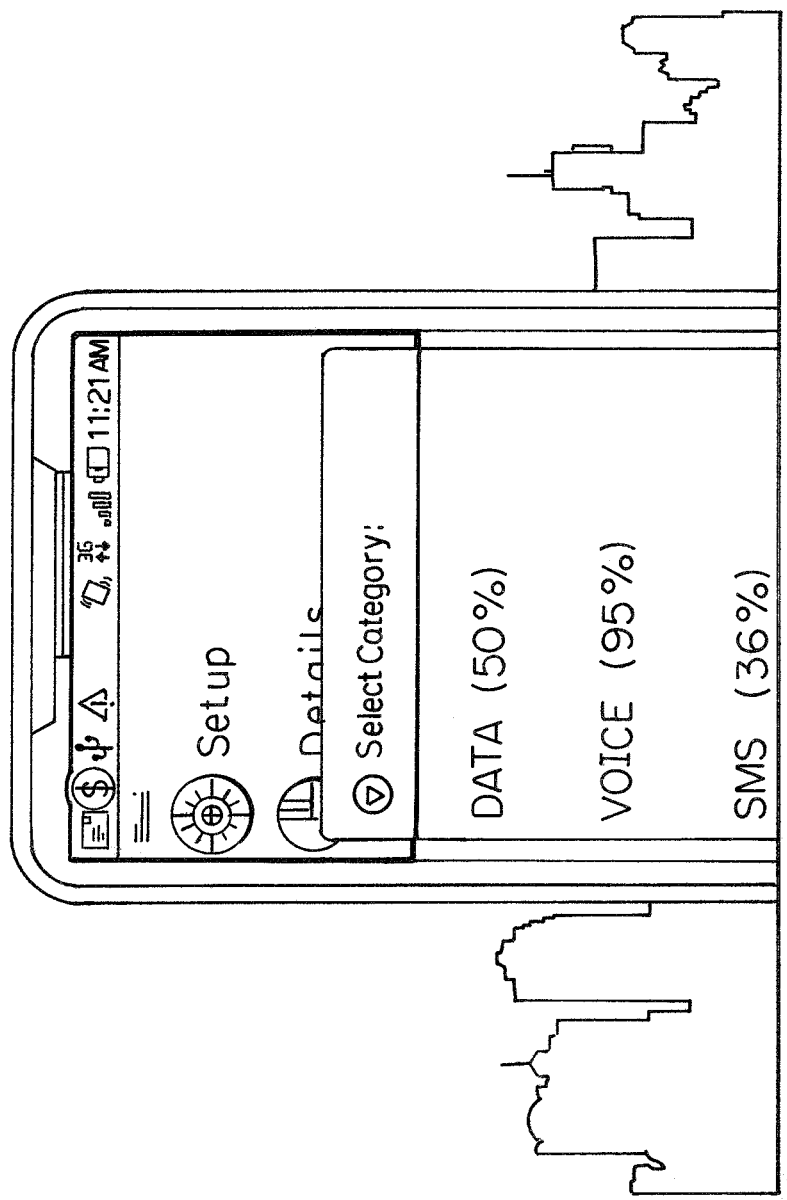
FIG. 5 is an illustration of a notification sent to a user device according to the embodiment of FIG. 4.

Once the user has provided all of the registration and device plan information, the user may have the option to set thresholds and set rules with threshold module 124. For example, the user may decide to set a threshold of 50% for voice, data and/or text messaging (SMS) usage. If the threshold is reached, a number of actions are possible. In one embodiment, notification module may provide a notification that the threshold has been reached. It should be noted that any level may be selected for a notification. For example, FIG. 5 illustrates a notification that is provided where data usage is 50%, voice usage is 95% and text messaging (SMS) usage is 36%. The notification may be provided at virtually any type of message, including a text message that is sent to the user's mobile device(s) 102, 102', 102", 102'", or an email accessible with the user computer 106. Alternatively, the notification may comprise an alert that is designed to get the user's attention when the user logs into the server 104. Still further, the notification, when provided as an email may include a link that when clicked on navigates the user to the server 104 and presents the user with additional information relating to the notification. It should be understood that the notification may be pushed out to the user or may pull the user to the system for further information or both.

Figure 4:
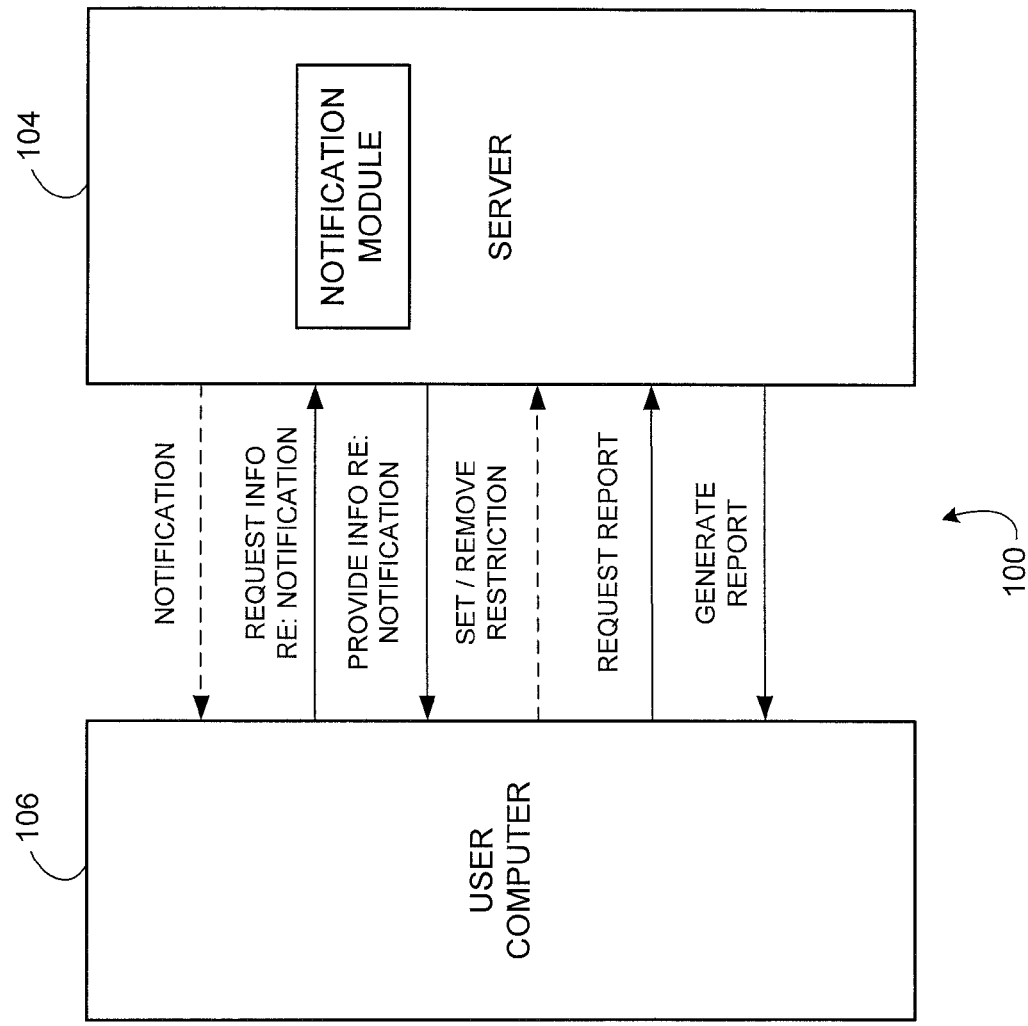
FIG. 4 is a block diagram according to the embodiment of FIG. 3.

The process of receiving a notification is further illustrated in FIG. 4 where a notification is received by user computer 106. It should be noted that the notification is shown in broken line to illustrate that the notification may be received in a number of different ways (e.g., email, SMS, etc.). The user can access server 104 to request information relating to the notification. For example, while some basic information may be provided in the notification that may be sent to the user (e.g., see FIG. 5), it is understood that additional information may be provided by system 100 relating to the usage of mobile device(s) 102, 102', 102", 102'". This additional information may include information relating to multiple mobile devices providing a breakdown of how much voice, data and SMS usage is attributed to each individual mobile device 102, 102', 102", 102'". It is further understood that the individual mobile device 102, 102', 102", 102'" could include a breakdown of the usage over time (e.g., a day by day breakdown of usage).

Figure 6:
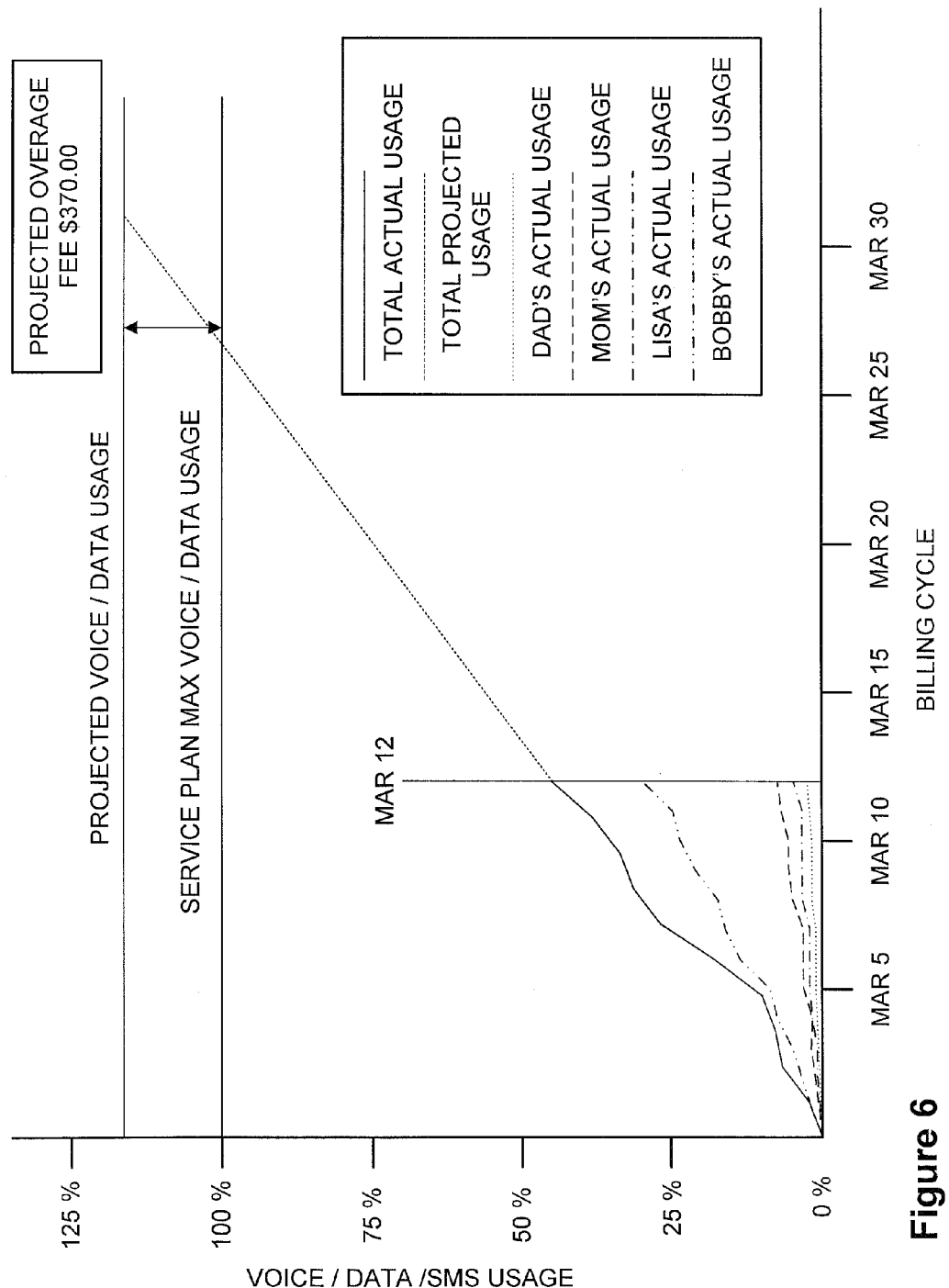
FIG. 6 is an illustration of a line graph according to the embodiment of FIG. 4.
Figure 7:
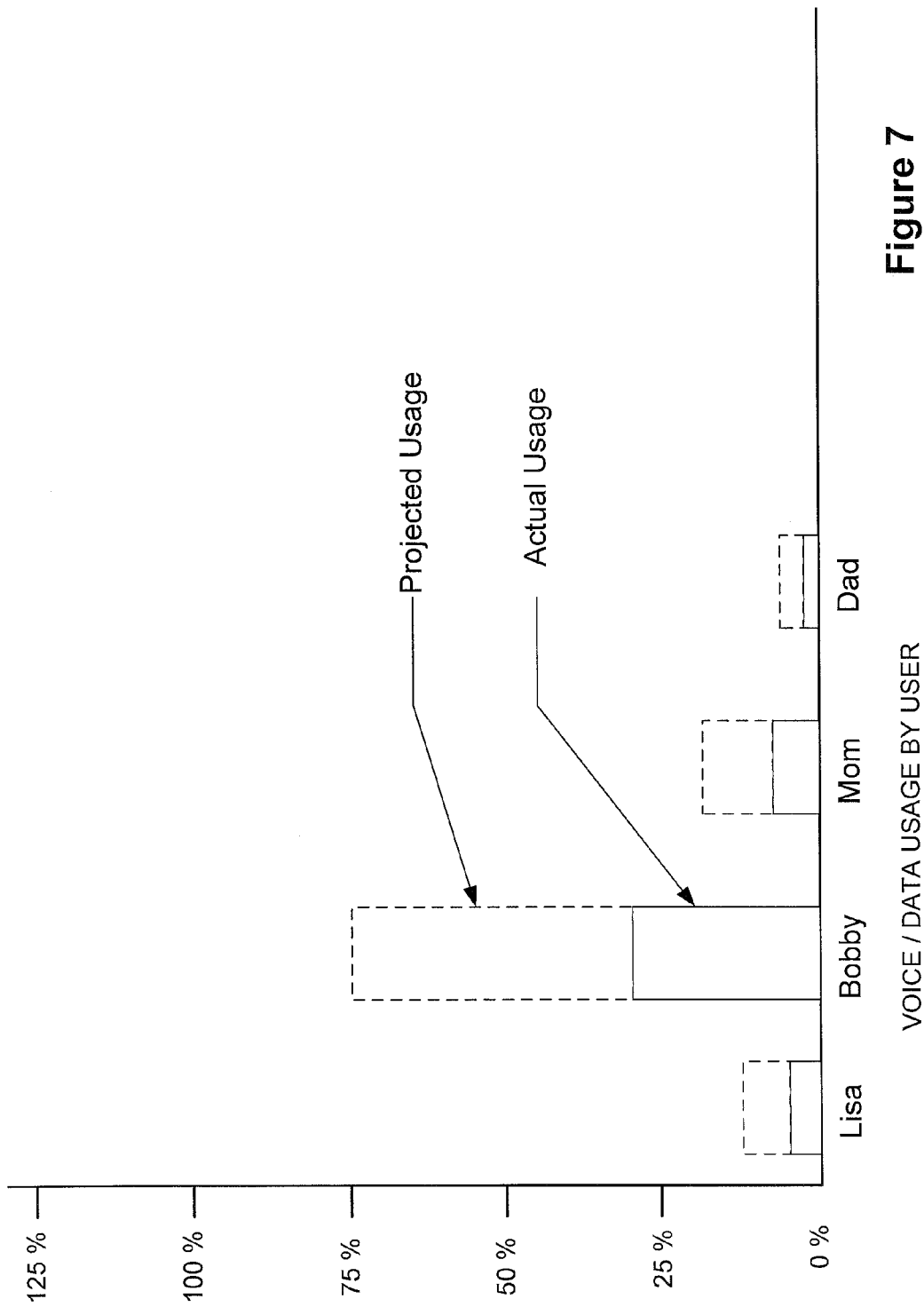
FIG. 7 is an illustration of a bar graph according to the embodiment of FIG. 4.

The user further has the option to request a report be generated that may include graphs illustrating total and individual mobile device 102, 102', 102", 102'" usage as illustrated in FIGS. 6 & 7. For example, FIG. 6 is a line graph illustrating the actual total usage of voice/data from the beginning of the billing cycle (March 1$^{st}$) up to, for example, March 12$^{th}$ which may have corresponded with a notification that was sent to the user once total usage for either voice or data or SMS usage reached a threshold (in this example, 45%). As can be seen, there are four mobile devices that are being tracked in the graph where each device usage is individually shown from the beginning of the billing cycle to the current date. Referring to FIG. 7, bar graph is provided illustrating the information provided in the line graph of FIG. 6. Another feature of system 100 is that, not only is actual usage shown in FIGS. 6 and 7, but projected usage is also provided for the remainder of the billing cycle. In the embodiments of FIGS. 6 and 7, a proportional or linear projection is provided based on the usage over the current billing cycle. However, it is understood that historical information could also be used in the projection. For example, historically there could be heavy voice/data/SMS usage over the first two weeks of the billing cycle and relatively low voice/data/SMS usage over the last two weeks of the billing cycle. In this instance, the projected usage could take this historical information into account and lower the projected total usage. It should be understood that the projection could also be raised based on the historical information.

In the example shown in FIG. 6, a projected overage as a percentage of the total voice/data/SMS usage is provided (in this case projected up to approximately 117%). Also provided is an estimated overage fee (in this example, $370.00). In this way, a user is provided with a wealth of information relating to the total usage of voice or data or SMS (or any combination thereof, for example, each could be tracked independently on the graphs) and the individual usage as well as a projected total and individual usage. As this is provided to the user during the billing cycle, the user can then adjust the usage trend by, for example, in the illustration in FIGS. 6 and 7, telling Bobby to stop the intensive usage. It is contemplated that the report including the graphs could be printed out and shown to the individual(s) illustrating graphically their mobile device usage.

Another aspect of the invention allows the user to set rules for the mobile devices mobile device(s) 102, 102', 102", 102'". This can be done by means of rules module 126 shown in FIG. 3. It is contemplated that the user can set thresholds at which notifications are generated, but the thresholds can also be used to enact rules set by the user. For example, the user can disable the ability of a mobile device to access data or send/receive SMS messages in the event that 100% of the total allowed usage in the billing cycle is reached. Alternatively, a restriction could be imposed allowing only SMS messaging to continue, or voice usage could be restricted in duration (e.g., only 5 min calls) or restricted by phone number (student's phone can only call emergency numbers or parents numbers). These restrictions can be set up based on percentage of usage or based on a combination of percentage of usage and date. For example, once a threshold of 50% is reached, a notification may be sent. However, if 50% is reached in the first few days of the billing cycle, the mobile device(s) 102, 102', 102", 102'" may be restricted until the halfway point is reached in the billing cycle at which point the restrictions are removed.

It is further contemplated that restrictions could be applied to the mobile device(s) 102, 102', 102", 102'" based on the time of day. For example, a parent could restrict the mobile device(s) 102, 102', 102", 102'" from sending/receiving/accessing voice/data/SMS from 11 pm to 6 am as a parent does not want the student text messaging at 2 am or talking on the phone at that time. Alternatively, the restriction may be adjusted based on the day of the week, such that the restrictions are not applied on the weekend or during holidays. It is understood that the system 100 provides complete versatility allowing the user to set rules with the rules module 126 for the use of the mobile device(s) 102, 102', 102", 102''' as they see fit.

As seen in FIG. 4, once the user has logged onto the server 104 to review a notification and see a rule that may be in place to restrict the mobile device(s) 102, 102', 102", 102''', the user has the option to set or remove the particular restriction. For example, if the data usage of 50% is reached relatively quickly in the billing cycle, the rule may be in place to restrict data usage to no more than a specified amount per day. The user has the option to release the mobile device(s) 102, 102', 102", 102''' from the rule is the user chooses to do so. Alternatively, if a notification was sent and no rule is in place, the user has the option to set a rule restricting one or any of the mobile device(s) 102, 102', 102", 102'''. In this way the user is provided with increased information regarding total and individual usage and is provided with a very useful tool for managing the mobile device(s) 102, 102', 102", 102'''. "Bill shock" can be avoided because the system 100 is alerting the user to a trend so that the user can take action to prevent the overage charge(s). Alternatively, the user is provided with enhanced controls over student's mobile device(s) 102, 102', 102", 102''' use.

Figure 8:
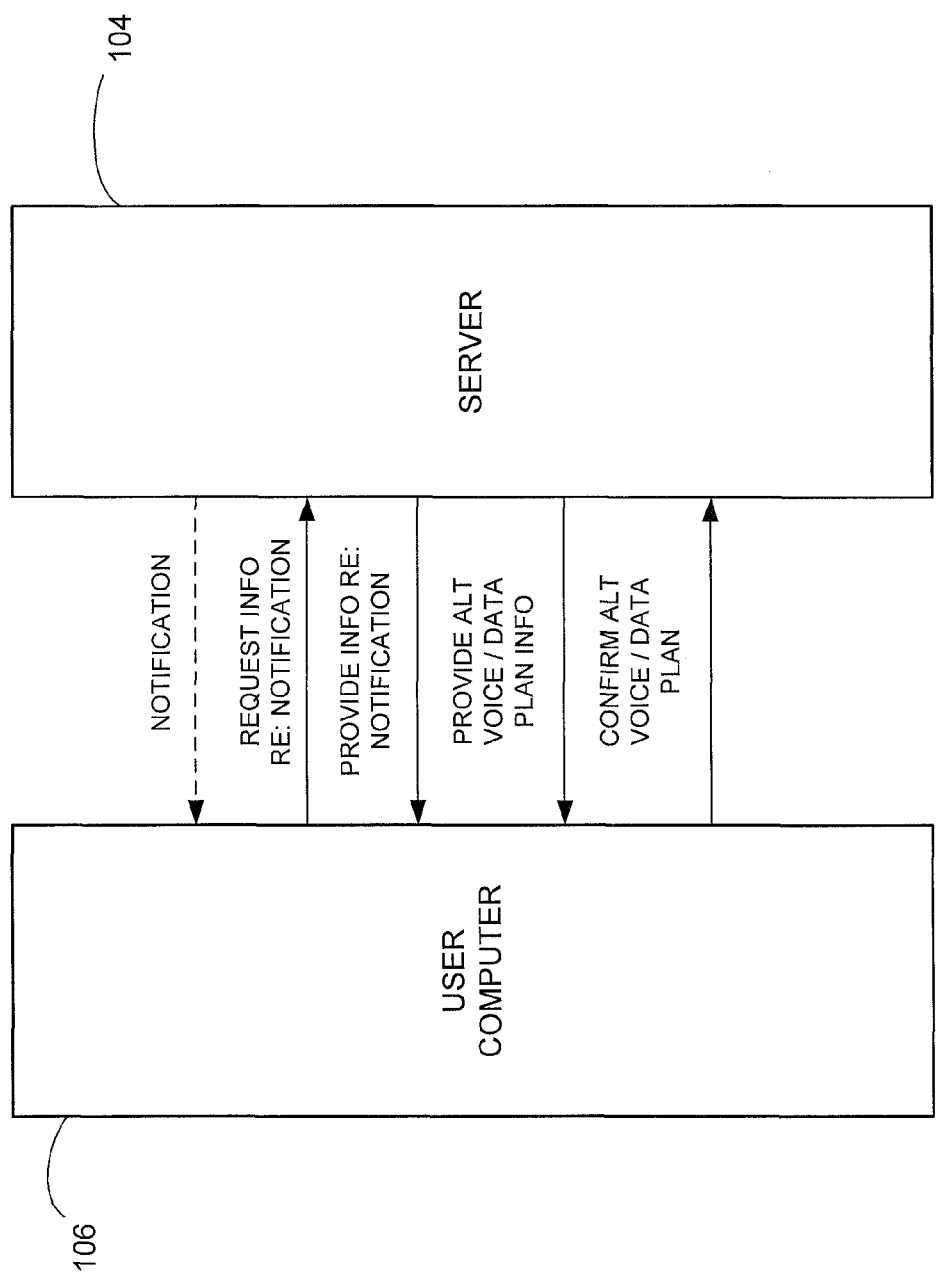
FIG. 8 is a block diagram of according to the embodiment of FIG. 3.

FIG. 8 provides yet another feature of system 100 to help control costs. For example, if a user sees that a projected overage appears to be likely, the system 100 can provide information to the user relating to alternative service provider plans. The alternative plans could be from the current service provider or from a different service provider. However, based on current actual usage or historical usage or combinations thereof, the system 100 can provide suggestions to the user as to how to reduce costs for the use of the mobile device(s) 102, 102', 102", 102'''. This information could be in the form of a list of alternative service plans, or a list of upgrades to the current service plan, or a consolidation of multiple different plans, etc. The user is provided with basic information and may be provided with a cost comparison between switching to one of the new alternative plans and paying the estimated overage. Alternatively, the system 100 could provide an estimated cost savings over multiple billing cycle (e.g., for the year), which could be provided in the form of a line and/or bar graph. In any event, the user is again provided maximum versatility in being able to control costs associated with the use of the mobile device(s) 102, 102', 102", 102'''.

In addition to providing notifications about projected overage fees and suggesting potential service plan migration, the system 100 can further suggest additional ways in which to save the family money. For example, information relating to the current service plan may include a "friends and family" feature allowing individuals in the "friends and family" defined network to communicate with each other at a discounted rate. The system 100 can monitor usage for the mobile device(s) 102, 102', 102", 102''' and suggest adjustments to the numbers in the "friends and family" defined network. For example, "Carrie" (a friend of Lisa) may be listed in the "friends and family" defined network, however, over time Lisa's calling habits have changed such that she is now spending more minutes communicating with David than Carrie. The system could provide a suggestion to replace Carrie with David and could provide an estimated cost savings for doing so based on the historical data.

Figure 9:
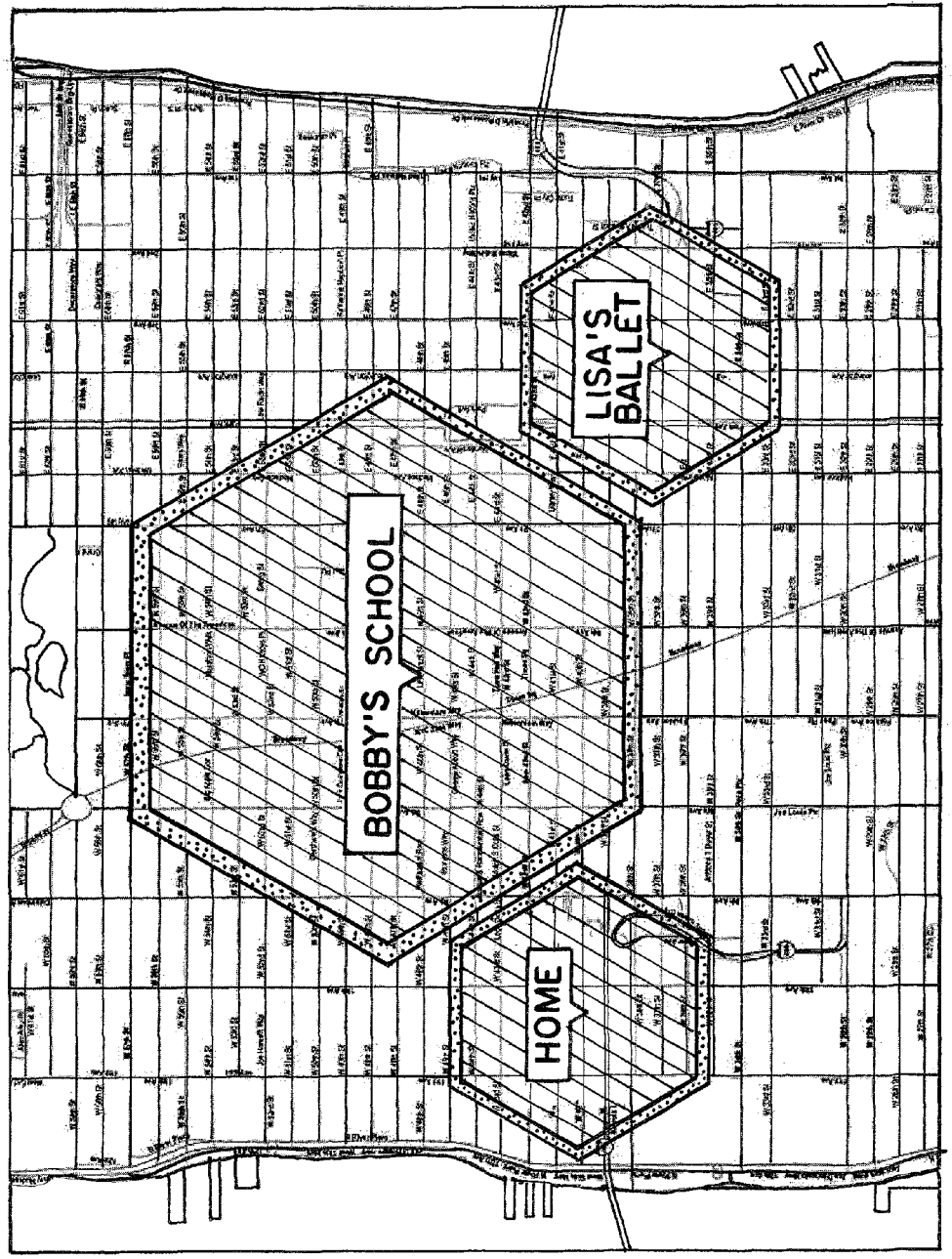
FIG. 9 is an illustration of screen display for defining a geo-fence for multiple mobile devices based on the time of day according to the embodiment of FIG. 1.
Figure 10:
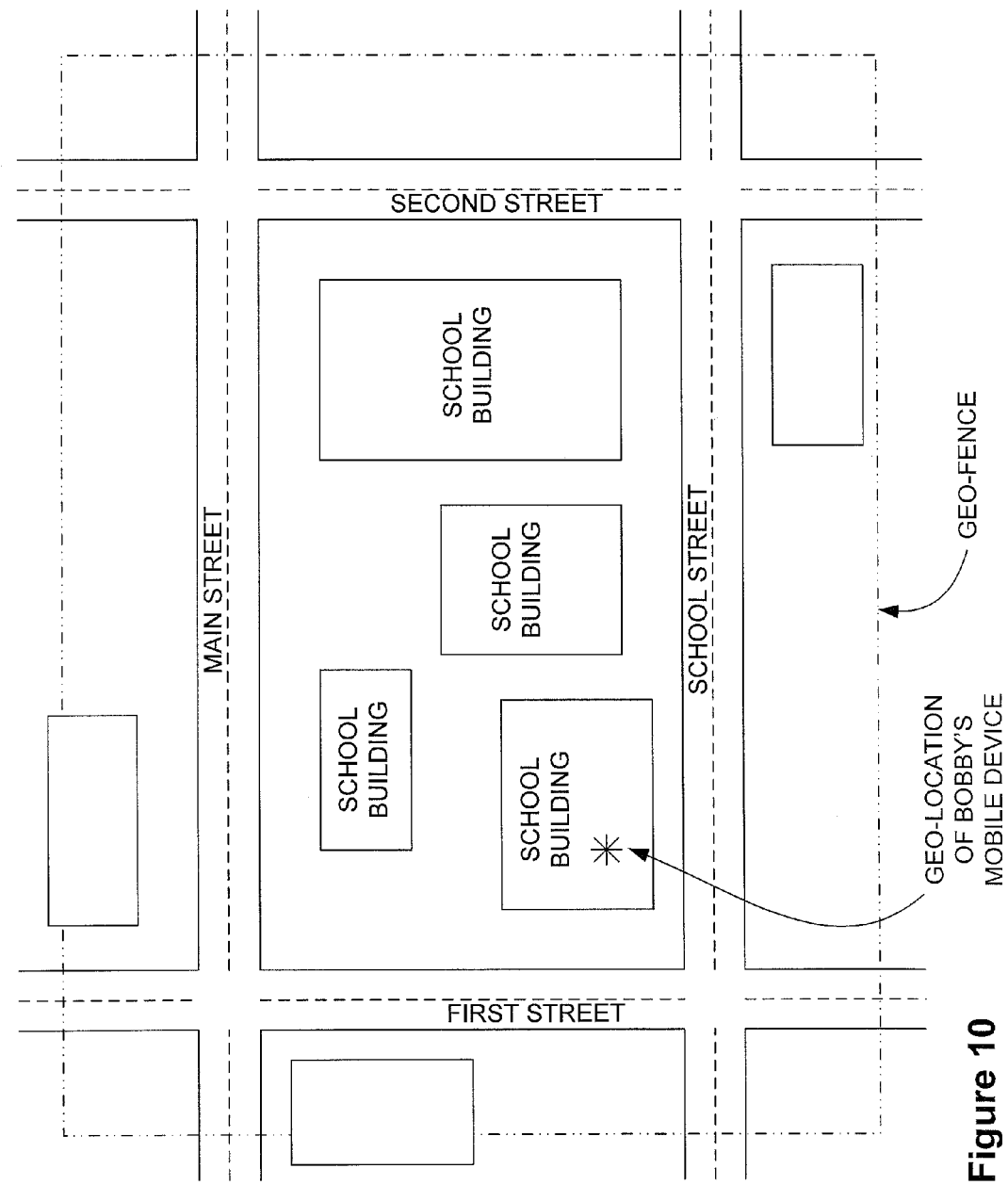
FIG. 10 is an illustration of a defined geo-fence for a mobile device according to the embodiment of FIG. 1.
Figure 11:
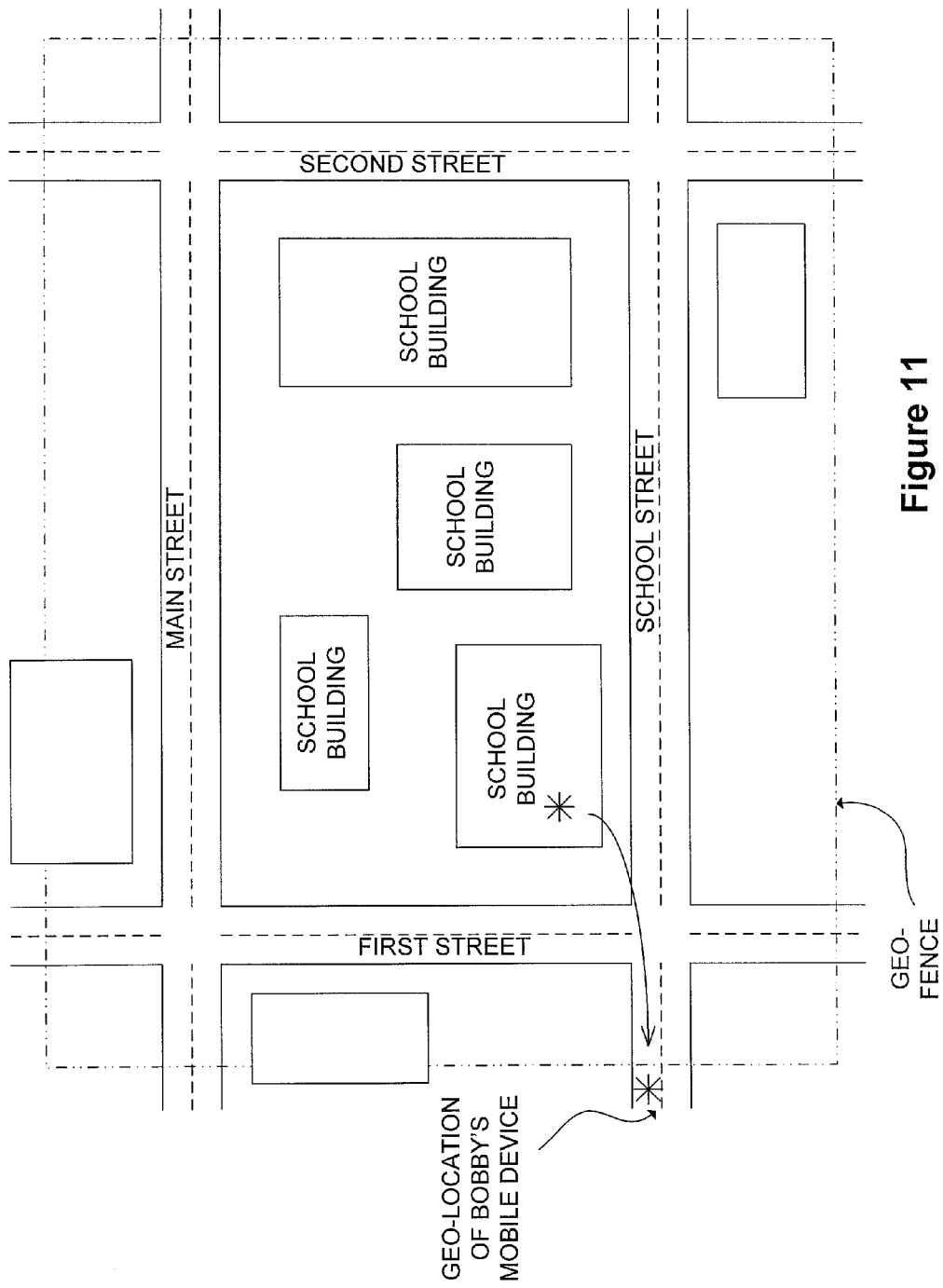
FIG. 11 is an illustration of a defined geo-fence for a mobile device according to the embodiment of FIG. 10.

Additional rules that can be provided are illustrated in FIGS. 9-11 relating to the creation of a geo-fence(s). FIG. 9 shows a map listing "Home", "Bobby's School" and "Lisa's Ballet." In setting rules, the user has the option to set up geo-fences for the student's mobile device(s) 102, 102', 102", 102'''. For example, the user (parent) may want to receive a notification if Bobby's mobile device(s) 102, 102', 102", 102''' leave the geo-fence area during particular time of the day as illustrated in FIGS. 10 and 11. The rule could be set to send a notification if Bobby's mobile device(s) 102, 102', 102", 102''' leaves the school geo-fence anytime during the school day from 8 am-2:30 pm during the school week. Alternatively, during that time, the user (parent) may want to restrict access to voice/data/SMS such that Bobby is unable to have unlimited access to data (streaming media) or SMS (no more than 5 text messages) or voice (2 min maximum phone call or only have access to emergency or parents phone numbers). In this manner the user can ensure the a younger student is not unduly distracted by the mobile device(s) 102, 102', 102", 102''' while in school when they should be in class and paying attention.

This feature can also be used as a safety feature such that if the student is forced to leave the geo-fence area, a notification is sent to the parent without the student having to send any type of message. The location of the mobile device(s) 102, 102', 102", 102''' can be tracked. Alternatively, for elderly individuals, a similar feature can be used to help identify their location if necessary.

It is contemplated that when setting up geo-fences, the user may simply be presented with a map and could draw a circle around the area. While hexagons are shown in FIG. 9 and rectangles in FIGS. 10 and 11, it is understood that the geofence could take any shape desired and could even be drawn, for example, free-hand. Again, maximum versatility is provided to the user to define the geo-fence as desired. When a geo-fence is defined for a particular mobile device(s) 102, 102', 102", 102''', the user can then further define a time of day, day of the week, etc., along with the physical location for the threshold and notification.

As the system 100 is web-based, users (parents) can login from virtually anywhere to monitor usage, run reports, receive notifications and administer rules as the system 100 is accessible via the web portal.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for managing a mobile telecommunications device comprising:
   a server having a storage and coupled to a network, said server presenting a webpage accessible by a user computer;
   software executing on said server allowing a user to register at least one mobile device with the system;
   software executing on said server receiving information relating to a telecommunications service plan associated with the at least one mobile device;
   software executing on said server to set at least one threshold for the at least one mobile device, the threshold selected from the group consisting of: an amount of voice minutes, or an amount of data usage, or an amount of text messages, or an amount of email, or a geographic location for the mobile device, or combinations thereof;
   software executing on said server generating a notification when the at least one threshold is reached;
   software executing on said server setting at least one rule for the at least one mobile device selected from the group consisting of: mobile device is restricted during selected time of day, or mobile device is restricted in specified location, or mobile device is restricted when the at least one threshold is reached, or combinations thereof.

2. The system according to claim 1 where said at least one mobile device comprises a smart phone.

3. The system according to claim 1 wherein the information relating to a telecommunications service plan is selected from the group consisting of: user name, user address, mobile number, total minutes for a billing cycle, total data for a billing cycle and a total number of text messages for a billing cycle.

4. The system according to claim 1 wherein the notification is transmitted as either a text message or an email.

5. The system according to claim 1 wherein the restriction is selected from the group consisting of: restrict voice usage, or restrict text messaging, or restrict data usage, or restrict application usage, or restrict data sources or combinations thereof.

6. The system according to claim 5 wherein when the restriction is selected as restrict voice usage, the mobile device may only connect with specified telephone numbers for voice usage.

7. The system according to claim 1 further comprises software executing on said server setting at least one rule for the mobile device, said rule defines a geo-fence area for the mobile device, said software tracking the location of the mobile device such that if the mobile device is moved out of the geo-fence, the at least one threshold is reached.

8. The system according to claim 7 wherein the threshold is reached if the mobile device remains stationary for a pre-defined period of time.

9. The system according to claim 7 wherein the location of the tracked mobile device is stored in the storage, and said software presents the tracking information to a user that logs into the webpage and views the stored tracking information.

10. The system according to claim 7 wherein said geo-fence is associated with a school location.

11. The system according to claim 1 wherein the notification provides actual usage for said at least one mobile device over a current billing cycle.

12. The system according to claim 1 wherein the notification provides a prediction for said at least one mobile device usage over a current billing cycle.

13. The system according to claim 12 wherein the predicted usage is based on actual usage during the current billing cycle or on historical mobile device usage during at least one previous billing cycle or combinations thereof.

14. The system according to claim 1 wherein the mobile device comprises a plurality of mobile devices associated with the telecommunications service plan.

15. A system for managing a mobile telecommunications device comprising:

a server having a storage and coupled to a network, said server having a webpage accessible by a user computer;

software executing on said server to register a mobile telecommunications device with the system having an associated telecommunications service plan defining a service limit for a billing cycle;

software executing on said server to set at least one threshold for the mobile telecommunications device, the threshold associated with at least one telecommunications service provided under telecommunications service plan, the service selected from the group consisting of: voice minutes, or data usage, or text messages, or email, or a geographic location for the mobile device, or combinations thereof;

software executing on said server setting at least one rule for the at least one mobile device selected from the group consisting of: mobile device is restricted during selected time of day, or mobile device is restricted in specified location, or mobile device is restricted when the at least one threshold is reached, or combinations thereof.

16. The system according to claim 15 where said at least one mobile device comprises a smart phone.

17. The system according to claim 15 wherein a notification is generated when the at least one threshold is reached and the notification is transmitted as either a text message or an email.

18. The system according to claim 15 further comprises software executing on said server setting at least one rule for the mobile device, said rule defines a geo-fence area for the mobile device, said software tracking the location of the mobile device such that if the mobile device is moved out of the geo-fence, the at least one threshold is reached.

19. The system according to claim 18 wherein said geo-fence is associated with a school location.

20. The system according to claim 15 wherein a notification is generated when the at least one threshold is reached and the notification provides actual usage for said at least one mobile device over a current billing cycle.

21. The system according to claim 15 wherein a notification is generated when the at least one threshold is reached and the notification provides a prediction for said at least one mobile device usage over a current billing cycle.

22. The system according to claim 21 wherein the predicted usage is based on actual usage during the current billing cycle or on historical mobile device usage during at least one previous billing cycle or combinations thereof.

23. The system according to claim 15 wherein the mobile device comprises a plurality of mobile devices associated with the telecommunications service plan.

* * * * *